A. TANDY.
Gate.
No. 69,509.
Patented Oct. 1, 1867.
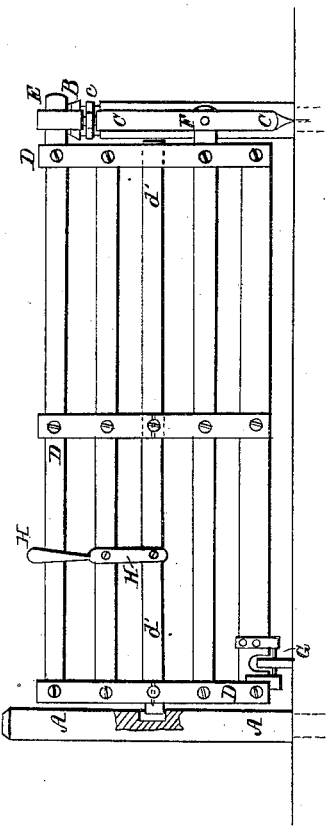

United States Patent Office.

A. TANDY, OF COLUMBIA, MISSOURI.

Letters Patent No. 69,509, dated October 1, 1867.

IMPROVEMENT IN GATES.

The Schedule referred to in these Letters Patent and making part of the same.

TO ALL WHOM IT MAY CONCERN:

Be it known that I, A. TANDY, of Columbia, in the county of Boone, and State of Missouri, have invented a new and useful Improvement in Gates; and I do hereby declare that the following is a full, clear, and exact description thereof, which will enable others skilled in the art to make and use the same, reference being had to the accompanying drawings, forming part of this specification, in which—

Figure 1 is a side view of my improved gate.

Similar letters of reference indicate like parts.

My invention has for its object to furnish an improved gate, simple in construction, and durable, and which can be opened and closed over obstructions, or up or down hill, as may be desired or necessary; and it consists in the manner of pivoting or poising the gate in the construction of the upper hinge, and in the construction of the latch, the whole being constructed and arranged as hereinafter more fully described.

A and B are the front and rear gate-posts, which are set in the ground in the ordinary manner. C is a bar, which is connected to the post B in such a manner that it may be free to revolve. This may be done by pivoting its lower end to a block of stone or wood, set in the ground at the foot of the post B, and connecting its upper end to the said post by a strap or band, $c'$, passing around the said bar and secured to the said post. D is the gate, upon the rear end of which is formed, or to it is attached, projections E and F. If desired these projections may be formed by the projecting ends of the horizontal bars of the gate. The lower projection F is pivoted in a slot in the lower part of the bar C, in such a way that the forward end of the gate may be free to move up and down. The upper projection E, which is simply a guide, passes through and works in a slot in the upper end of the bar C; the upper hinge of the gate being thus formed by the combination of a slot and guide. This construction leaves the forward end of the gate free to move up or down, in passing over obstructions or the surface of uneven ground. G is a friction-wheel, pivoted to the lower part of the forward end of the gate in such a way that its axis may be on a line with the gate D. One of the horizontal bars $d'$ of the gate is made movable by passing the screws or bolts, by which it is held in place, through slots formed in the said bar, of such a length that the bar may have a sufficient play to act as a latch to hold the gate closed. The bar $d'$ is operated by a hand-lever, H, the lower end of which is pivoted to the bar $d'$, and its middle part to the bar above, as shown in fig. 1. The upper end of the lever H is used as a handle to operate the latch or bar. The bar $d'$, when pushed forward, enters a mortise in the post A, as shown in fig. 1. If desired, the forward end of the gate D may be raised, so as to swing clear of mud, snow, or other obstructions, and held in that position by passing a pin through a hole in the projection E, in the rear of the slot or guide, as the case may be.

Having thus described my invention, what I claim as new, and desire to secure by Letters Patent, is—

Forming the upper hinge of a slot in the upper end of the bar C and guide E, substantially in the manner herein shown and described and for the purpose set forth.

A. TANDY.

Witnesses:
G. W. TRIMBLE,
H. McCONATHY.